United States Patent
Wiemker et al.

(10) Patent No.: US 9,754,366 B2
(45) Date of Patent: Sep. 5, 2017

(54) COMPUTER-AIDED IDENTIFICATION OF A TISSUE OF INTEREST

(71) Applicant: KONINKLIJKE PHILIPS N.V., Eindhoven (NL)

(72) Inventors: Rafael Wiemker, Kisdorf (DE); Sven Kabus, Hamburg (DE); Tobias Klinder, Uelzen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 81 days.

(21) Appl. No.: 14/651,276

(22) PCT Filed: Dec. 17, 2013

(86) PCT No.: PCT/IB2013/061021
§ 371 (c)(1),
(2) Date: Jun. 11, 2015

(87) PCT Pub. No.: WO2014/102661
PCT Pub. Date: Jul. 3, 2014

(65) Prior Publication Data
US 2015/0317792 A1  Nov. 5, 2015

Related U.S. Application Data

(60) Provisional application No. 61/746,182, filed on Dec. 27, 2012.

(51) Int. Cl.
*G06K 9/00* (2006.01)
*G06T 7/00* (2017.01)
(Continued)

(52) U.S. Cl.
CPC ............ *G06T 7/0012* (2013.01); *G06T 11/00* (2013.01); *G06T 11/60* (2013.01); *G06T 19/20* (2013.01);
(Continued)

(58) Field of Classification Search
None
See application file for complete search history.

(56) References Cited

U.S. PATENT DOCUMENTS 7,558,674 B1   7/2009 Neilley et al.
7,616,799 B2  11/2009 Ramamurthy et al.
(Continued)

FOREIGN PATENT DOCUMENTS

WO   2006009675 A2   1/2006
WO   2006009751 A2   1/2006
WO   2006056221 A1   6/2006

OTHER PUBLICATIONS

Siemens Medical; Clinical Applications: syngo LungCARE CT Sales Brochure accessed Dec. 5, 2012 www.healthcare.siemens.com/synco/LungCARE CT.
(Continued)

*Primary Examiner* — Nancy Bitar (57) ABSTRACT

A method includes determining a change in a volume of a tissue of interest located in at least two data sets between the at least two data sets. The at least two image data sets include a first image data set acquired at a first time and a second image data set acquired at a second time, and the first and second times are different. The method includes generating a rendering which includes a region in which the tissue of interest is located and indicia that indicates a magnitude of the change across the region. The region is superimposed over the rendering, which is generated based on at least one of the at least two image data sets, and linked to a corresponding image respectively in the at least two image data sets including voxels representing tissue of interest. The method includes visually presenting the rendering in a graphical user interface.

20 Claims, 4 Drawing Sheets

(51) Int. Cl.
*G06T 11/60* (2006.01)
*G06T 11/00* (2006.01)
*G06T 19/20* (2011.01)

(52) U.S. Cl.
CPC  *G06T 2200/24* (2013.01); *G06T 2207/10072* (2013.01); *G06T 2207/30064* (2013.01); *G06T 2210/41* (2013.01); *G06T 2219/028* (2013.01); *G06T 2219/2012* (2013.01)

(56) References Cited

U.S. PATENT DOCUMENTS

| | | | |
|---|---|---|---|
| 7,876,939 | B2 | 1/2011 | Yankelevitz et al. |
| 8,096,948 | B2* | 1/2012 | Schreckenberg ........ A61B 8/08 600/413 |
| 8,160,314 | B2 | 4/2012 | Ramamurthy et al. |
| 2005/0002548 | A1 | 1/2005 | Novak et al. |
| 2005/0017972 | A1* | 1/2005 | Poole .................... A61B 5/7445 345/424 |
| 2005/0065421 | A1* | 3/2005 | Burckhardt ............ A61B 6/032 600/407 |
| 2005/0256399 | A1* | 11/2005 | Sirohey .................... A61B 6/00 600/425 |
| 2008/0132788 | A1* | 6/2008 | Schreckenberg ........ A61B 8/08 600/443 |
| 2010/0158330 | A1* | 6/2010 | Guissin .............. G06K 9/00369 382/128 |
| 2010/0316272 | A1 | 12/2010 | Kadir et al. |
| 2011/0268336 | A1 | 11/2011 | Dmitrieva et al. |
| 2012/0081386 | A1 | 4/2012 | Wiemker et al. |
| 2014/0072194 | A1* | 3/2014 | Hansis ................... A61B 6/032 382/128 |

OTHER PUBLICATIONS

Wiemker, R., et al.; Performance study of a globally elastic locally rigid matching algorithm for follow-up chest CT; 2008; Proc. of SPIE; vol. 6917; pp. 691706-1 thru 691706-10.

Zheng, Y., et al.; Lung Nodule Growth Analysis from 3D CT Data with a Coupled Segmentation and Registration Framework; 2007; IEEE 11th Int'l. Conf. on Computer Vision; pp. 1-8.

* cited by examiner

COMPUTER-AIDED IDENTIFICATION OF A TISSUE OF INTEREST

CROSS REFERENCE TO RELATED APPLICATIONS

This application is a national filing of PCT application Serial No. PCT/IB2013/061021, filed Dec. 17, 2013, published as WO 2014/102661 A2 on Jul. 3, 2014, which claims the benefit of U.S. provisional application Ser. No. 61/746, 182 filed Dec. 27, 2012, which is incorporated herein by reference.

The following generally relates to computer-aided identification of a tissue of interest and is described with particular application to computed tomography (CT); however, other imaging modalities, such as three dimensional (3D) X-ray, magnetic resonance imaging (MM), and/or other imaging modalities are also contemplated herein.

A computed tomography (CT) scanner includes an x-ray tube that emits radiation that traverses an examination region and a portion of a subject therein and is detected by a detector. The detector generates and outputs a signal indicative of the examination region and the portion of the subject therein. A reconstructor processes the signal, reconstructing volumetric image data indicative of the examination region and the portion of the subject therein. Such image data acquired at different points in time has been compared and utilized to identify tissue of interest. For example, the comparison has been used to facilitate determining a growth of a lung nodule over time, and this information has been used to facilitate determining whether the nodule is malignant based on a metric such as a growth doubling time metric.

The above discussed image data comparison and tissue of interest growth determination has been performed through manual inspection by a clinician or the like visually observing the image data and/or with the assistance of a computer, for example, executing a computer aided detection (CAD) algorithm. Manual inspection has been time consuming as the clinician sequentially visually compares image slices from different image data sets. Furthermore, manual inspection is prone to error. For example, tissue neighboring the nodule and having a similar value in the image data may appear to be part of the nodule, which may result in overestimating the volume of the nodule, and/or a portion of a nodule may be hidden by other tissue, resulting in underestimating the volume of the nodule, both leading to false negatives or false positives with respect to identifying malignancy.

With a computer assisted approach, a computer is first used to identify images from a current image data set that are likely to include voxels representing nodules. The clinician then observes these images, rejecting images that do not include nodules or includes nodules not of interest, and confirms images with nodules of interest. The computer then processes a previously acquired image data set, identifying nodules matching the confirmed nodules. The clinician then reviews the matches, rejecting pairs not of interest (e.g., likely to be benign) and confirming pairs of interest (e.g., likely to be malignant). The computer then segments confirmed matched nodules and determines and presents a nodule growth rate between each match. This approach can be time consuming and tedious, requiring multiple interactions between the clinician and the computer just to get to the point where the clinician can observe nodule growth.

Aspects described herein address the above-referenced problems and others.

In one aspect, a method includes determining a change in a volume of a tissue of interest located in at least two data sets between the at least two data sets. The at least two image data sets include a first image data set acquired at a first time and a second image data set acquired at a second time, and the first and second times are different. The method further includes generating a rendering which includes a region in which the tissue of interest is located and indicia that indicates a magnitude of the change across the region. The region is superimposed over the rendering, which is generated based on at least one of the at least two image data sets, and linked to a corresponding image respectively in the at least two image data sets including voxels representing tissue of interest. The method further includes visually presenting the rendering in a graphical user interface.

In another aspect, an image data processing system includes a change in tissue volume determiner that determines a change a volume of a tissue of interest, located in at least two data sets, between the at least two data sets. The at least two image data sets include a first image data set acquired at a first time and a second image data set acquired at a second time, and the first and second times are different. The image data processing system further includes a rendering engine that combines a volume image generated based on the at least two data sets with a likelihood region that indicates a region in which the tissue of interest is located and indicia indicating a change in the volume of the tissue of interest across the region. The region is linked to a corresponding image respectively in the at least two image data sets including voxels representing tissue of interest. The image data processing system further includes a display which visually presents the rendering in a graphical user interface.

In another aspect, a computer readable storage medium is encoded with computer readable instructions, which, when executed by a processor of a computing system, causes the processor to: determine a change in a volume of a tissue of interest between the at least two data sets, and generate and visually present a rendering which includes a region in which a tissue of interest is located, first indicia that indicates a change in a magnitude of the volume across the region and second indicia that indicates a confidence that the tissue of interest is located in the region and that the change in magnitude across the region represents the change in magnitude, wherein the first indicia is a color or gray scale value and the second indicia is a transparency level.

The invention may take form in various components and arrangements of components, and in various steps and arrangements of steps. The drawings are only for purposes of illustrating the preferred embodiments and are not to be construed as limiting the invention.

Figure 1:
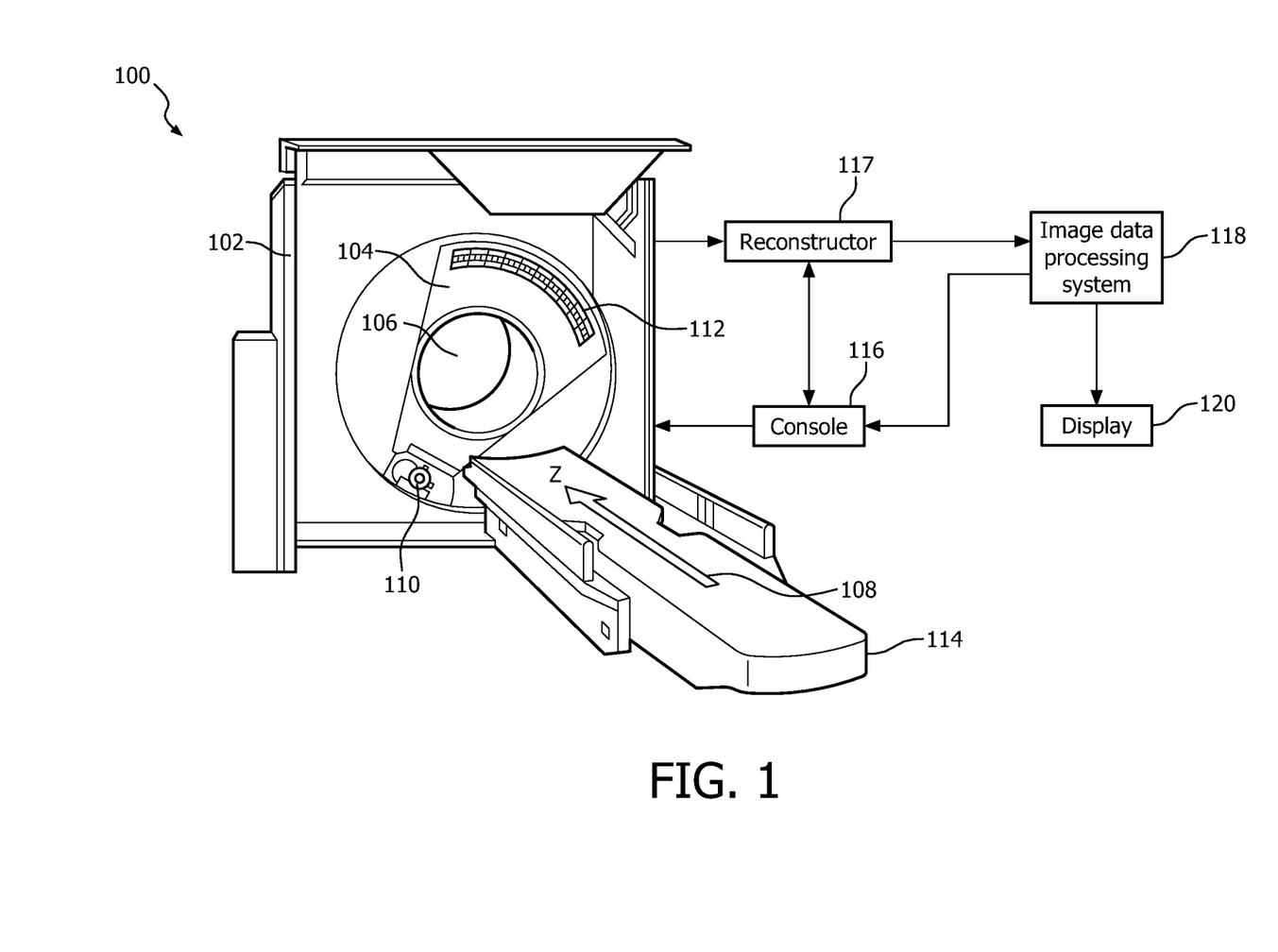
FIG. 1 schematically illustrates an image data processing system in connection with an imaging system.

FIG. 1 schematically illustrates an example imaging system 100 such as a CT scanner. In other embodiments, the imaging system 100 may include a 3D X-ray, MRI and/or other imaging system. The illustrated imaging system 100 includes a stationary gantry 102 and a rotating gantry 104, which is rotatably supported by the stationary gantry 102 and rotates around an examination region 106 about a z-axis 108.

A radiation source 110, such as an x-ray tube, is rotatably supported by the rotating gantry 104, rotates with the rotating gantry 104, and emits radiation that traverses the examination region 106. A radiation sensitive detector array 112 subtends an angular arc opposite the radiation source 110 across the examination region 106, detects radiation traversing the examination region 106, and generates a signal indicative thereof.

A subject support 114 supports an object or subject in the examination region 106. A reconstructor 117 reconstructs the projection data, generating volumetric image data. A general-purpose computer serves as an operator console 116. Software resident on the console 116 allows the operator to interact with the scanner 100. Such interaction includes, but is not limited to selecting a scan protocol, initiating scanning, etc.

An image data processing system 118 processes image data sets from at least two scans performed at two different points in time, determines a change in a volume (if one exists) of a tissue of interest between the image data sets, and generates a rendering, which can be visually displayed, via a monitor or display 120, with a region in which the tissue of interest is located and indicia identifying a magnitude of the change in volume across the region, and, optionally, a confidence level that the identified tissue of interest is in the region and the magnitude of the change is correct. Such a region is not included with the rendering for any of the tissue of interest where there is no change in volume between the image data sets. Note that a clinician viewing the rendering can determine that a tissue of interest is no longer of interest.

As described in greater detail below, in one non-limiting instance, the region is superimposed or overlayed over a volume rendering of the image data and is similar in appearance to a "hot spot" (or probability cloud or region) such as a "hot spot" of a positron emission tomography (PET) image showing glucose concentration or the like, with a geometry of the region indicative of a location, shape and/or size of the tissue of interest, a highlighting (e.g., different colors, a grayscale, etc.) indicative of a magnitude of the change in volume, and/or an opacity/transparency indicative of a confidence that the identified tissue of interest is in the region and/or the magnitude of the change is correct. The indicia may also provide direct links to a corresponding image respectively in the image data sets.

In one instance, the rendering provides an initial or first pass at identifying a particular type of a tissue of interest (e.g., a malignant nodule) based on a change in volume, without having a clinician first go through the image data sets and identify images with candidate tissue of interest and/or evaluate matches of the candidate tissue of interest with corresponding tissue in another image data set before any change in volume is determined. This can reduce the number of image pairs a clinician observes and/or a computer processes, for example, where the clinician evaluates only the computer identified image pairs and does not evaluate the other image pairs. Of course, one or more of the other image pairs can also be evaluated.

The image data processing system 118 can obtain the image data from the imaging system 100, another imaging system (a same or a different modality), and/or a data repository such as portable memory, a server, a database, a radiology information system (RIS), hospital information system (HIS), an electronic medical record (EMR), picture archive and communication system (PACS), etc.

The image data processing system 118 can be implemented via one or more processors of one or more computing systems executing one or more computer readable instructions embedded, encoded, etc. on computer readable storage medium such as physical memory and/or other non-transitory medium. Additionally or alternatively, at least one of the computer readable instructions can be carried by a carrier wave, signal, and/or other transitory medium.

Figure 2:
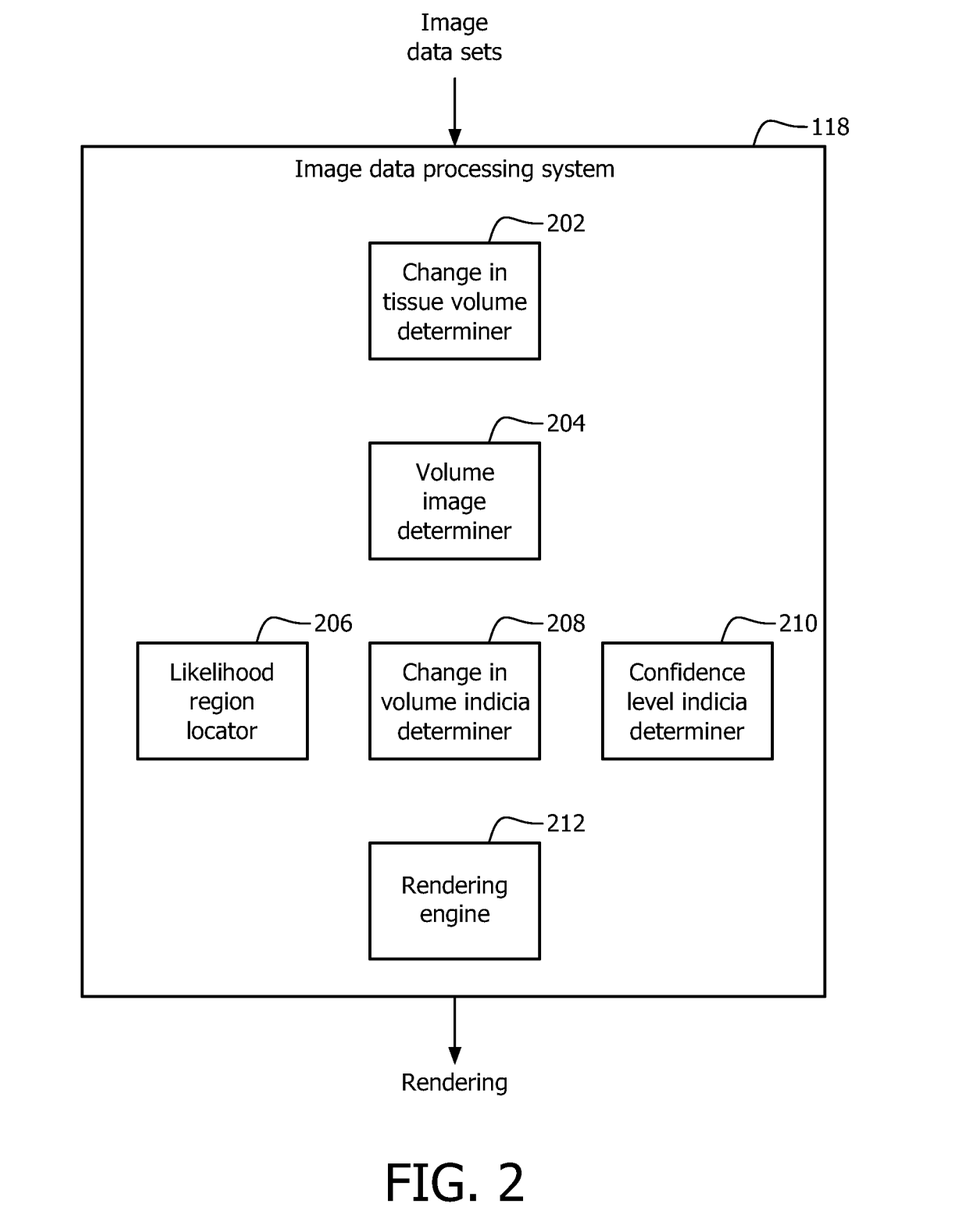
FIG. 2 schematically illustrates a non-limiting example of the image data processing system of FIG. 1.

FIG. 2 illustrates a non-limiting example of the image data processing system 118. As shown, the image data processing system 118 obtains, as input, image data sets from at least two scans performed at different moments in time.

The illustrated image data processing system 118 includes a change in tissue volume determiner 202 that determines a change in volume in tissue of interest represented in the image data sets. In one instance, the change in tissue volume determiner 202 first identifies the tissue of interest in two or more image data sets. This can be achieved through automated or semi-automated tissue identification algorithms. The change in tissue volume determiner 202 may then employ an elastic and/or rigid registration, based on one or more organs or the entire anatomy represented in the two of the image data sets, to register the image data sets. By way of example, an elastic registration can be used to register a full lung or thorax in previous and current image data sets.

The change in tissue volume determiner 202 then determines a change in a volume of the identified tissue of interest in the registered image data. In one example, the change in tissue volume determiner 202 can determine the change in a volume of the identified tissue of interest in the registered image data through image subtraction. In another example, the change in tissue volume determiner 202 can determine the change in the volume of the identified tissue of interest through determining a local Jacobi matrix of a registration vector field. For this approach, a Jacobian matrix is computed for each voxel of the three-dimensional image volume, and eigenvalues of the Jacobian matrix are computed for each voxel, which indicate changes in volume.

For example, where there is no growth, all eigenvalues have a value of zero; where there is growth in one dimension, one of the eigenvalues has a positive value; where there is growth in two dimensions, two of the eigenvalues have a positive value, and where there is growth in three dimensions, three of the eigenvalues have a positive value. An example using a Jacobian matrix is discussed in Zheng et al., "Lung Nodule Growth Analysis from 3D CT Data with a Coupled Segmentation and Registration Framework," IEEE Computer Society Workshop on Mathematical Methods in Biomedical Image Analysis (2007).

In another instance, the change in tissue volume determiner 202 first identifies the tissue of interest in only one of the image data sets (instead of two, as just discussed in the above approach). For example, the change in tissue volume determiner 202 may first identify the tissue of interest in only the most recently acquired image data of the image data sets. In this case, the change in tissue volume determiner 202 then matches a location of each region with identified tissue of interest with early (relative to the most recent) acquired image data of the image data sets. The change in tissue volume determiner 202 then simultaneously segments the tissue of interest in the two or more image data sets and determines the change in the volume in the tissue of interest. An example using a matching approach is described in Wiemker et al., "Performance Study of a Globally Elastic locally Rigid Matching Algorithm for Follow-Up Chest CT," Proc. of SPIE, Vol. 6917, 691760 (2008).

A combination of the above-discussed approaches and/or one or more different approaches are also contemplated herein. For example, in another instance, an accumulated density in a given radius around each voxel is computed. Then, a voxel-wise comparison of locally accumulated densities between both registered volumes is performed. Other approaches are also contemplated herein.

A volume image determiner 204 generates a three dimensional (3D) volume rendering based on the image data sets. In one instance, the volume image determiner 204 generates a 3D interactive Maximum Intensity Projection (MIP) rendering. In another instance, the volume image determiner 204 generates a minimum Intensity Projection (mIP). In yet another instance, the volume image determiner 204 generates another volume rendering.

A likelihood region locator 206 locates a region in the rendering in which the tissue of interest is located. A change in volume indicia determiner 208 determines visualization indicia that indicates a magnitude of the change in volume across the region. As described below, in one instance, the indicia is a gray scale value in which a gray value at one end of the gray scale represents little to no change in volume and a gray value at the other end of the gray scale represents a high degree of change in volume. In another instance, a color scale is instead used.

A confidence level indicia determiner 210 determines visualization indicia that indicates a confidence level that the tissue of interest is in the region and/or that the determined magnitude represents the change in volume. For the former, the confidence level may take into account the ability to separate or distinguish the tissue of interest from surrounding tissue. As described below, in one instance, this indicia is a transparency level in which a transparency value at one end of the scale represents lower confidence and a transparency value at the other end of the scale represents higher confidence.

A rendering engine 212 combines the 3D volume, the likelihood region, the change in volume magnitude indicia and/or the confidence level indicia. For example, in one instance, the rendering engine 212 superimposes or overlays the likelihood region over the 3D volume rendering, employing the change in volume magnitude indicia and the confidence level indicia to respectively determine a color and transparency throughout the likelihood region.

Figure 3A:
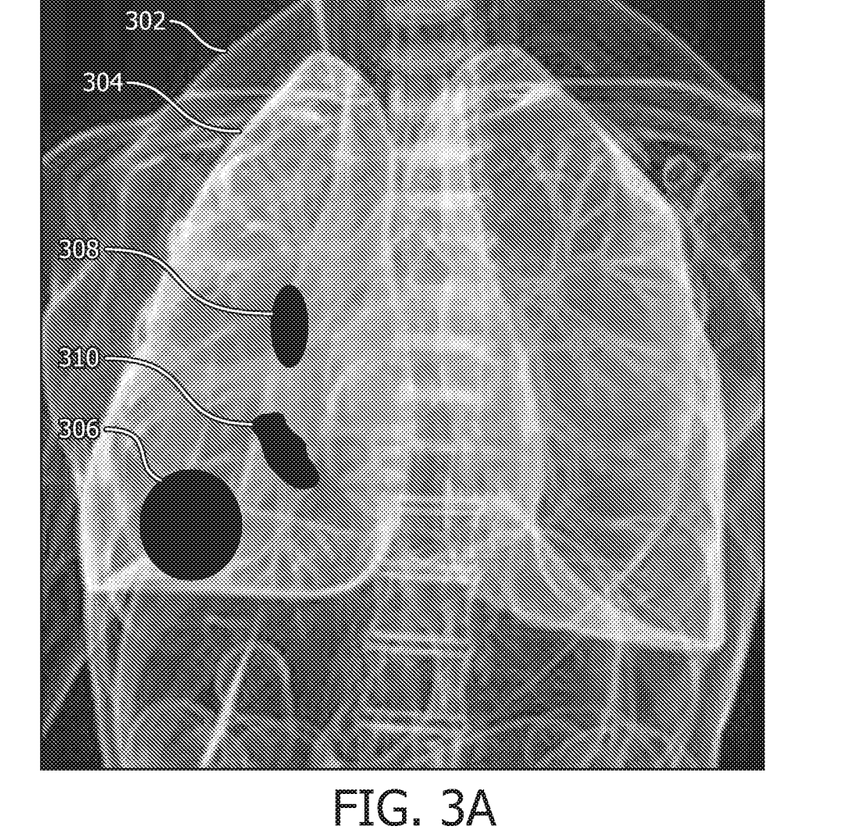
FIG. 3A illustrates a non-limiting example of a rendering generated by the image data processing system of FIG. 2.

A non-limiting example of such a rendering is shown in FIG. 3A. In this example, the tissue of interest is malignant nodules in the lungs. In FIG. 3A, non-lung tissue 302 is rendered with a high degree of transparency, indicating absence of lung nodule. Lung tissue 304 is rendered less transparent (or more opaque), relative to the non-lung tissue 302, indicating a low probability of a lung nodule.

A first region 306 represents a first region which includes a first nodule. The region 306, in this example, resembles a PET-like hot-spot image. A geometry of the region 306 indicates a volume in which the nodule is located. In this example, the region 306 is spherical. A color indicates a degree of a change in growth. In this example, a grayscale is used in which black represents higher growth and white represents lower growth. The region 306 is a gray level closer to black (95%), indicating high nodule growth.

A transparency level indicates a confidence level that the identified nodule is a nodule and that the growth is correct. In this example, a central region is rendered non-transparent (0% in this example), indicating a high degree of confidence that the nodule is located in the central region and the growth level is correct. An outer region is rendered more transparent (45% in this example), indicating a lower degree of confidence about the nodule location and growth. The transparency (and thus the confidence) increases (e.g., linearly or non-linearly) radially from the central region to the outer region.

A second region 308 represents a second region which includes a second nodule. A geometry of the second region 308 is ellipsoidal or oval. The second region 308 is less gray (75% in this example) relative to the first region 306, indicating less growth for this nodule, relative to the nodule in first region 306. The transparency is the same throughout the second region 308 (10%), indicating a constant but lower degree of confidence that a malignant nodule is located in the second region 308, relative to the first region 306.

A third region 310 represents a third region which includes a third nodule. A geometry of the third region 310 is irregular. The third region 310 varies in gray linearly (from 75% black to white) in a generally diagonal direction, indicating more growth in the upper left corner relative to a lower right corner. The transparency also varies in a generally diagonal direction. In this example, the transparency varies from 21% transparent to no transparency from the upper left corner relative to the lower right corner, indicating a varying confidence across the third region 310.

It is to be understood that the illustrated regions 306, 308, and 310 are not limiting. In another embodiment, there could be more or less such regions. In another embodiment, the regions can be another shape, such as curved, and/or size. In yet another embodiment, the regions can include a different gray level and/or transparency. In still another embodiment, a color scale (e.g., red, green and blue (RGB), cyan, magenta, yellow and Key/black (CMYK), etc.) can be used instead of the illustrated gray scale.

The rendering of FIG. 3A can be user manipulable. For example, the rendering can be presented in a graphical user interface (GUI) which includes graphic manipulation tools for rotating, panning, zooming, windowing, leveling, etc. the rendering. In addition, the rendering can be toggled between different visualization modes, for example, between MIP and minimum Intensity Projection (mIP) and/or other visualization.

Figure 3B:
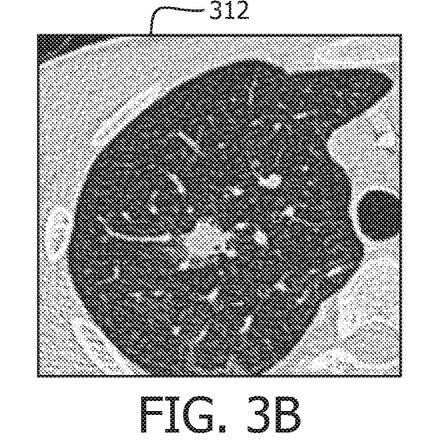
FIGS. 3B and 3C illustrate images from the image data sets used to generate the rendering of FIG. 3A.
Figure 3C:
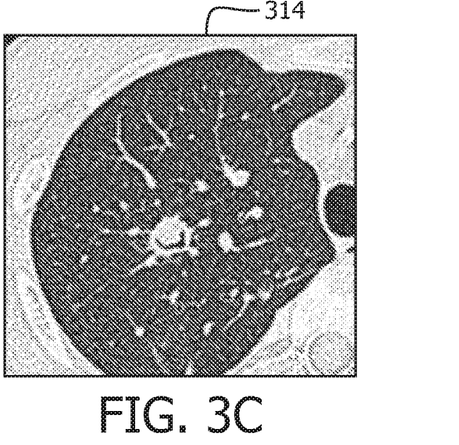

The rendering can also be linked to the image data sets such that hovering a mouse or the like over and clicking on a portion of one of the regions 306, 308 and 310 will invoke display of corresponding images 312 (FIG. 3B) and 314 (FIG. 3C) of the image data sets, along with the 3D rendering (FIG. 3A), or in place of the 3D rendering. The images 312 and 314 may include indicia to identify the location of the nodule.

Returning to FIG. 2, as discussed herein, the rendering represents an initial computer implemented first pass over the image data and is used to identify tissue of interest that changes in volume between image data sets. This can be used to identify a candidate set of images for further review. The clinician may then choose to only observe the identified images (or a subset thereof, e.g., based on the indicated growth magnitude and/or confidence), which reduces the volume of data the clinician would otherwise have to visually observe, relative to a configuration in which the image data processing system 118 is not employed and/or is omitted.

Figure 4:
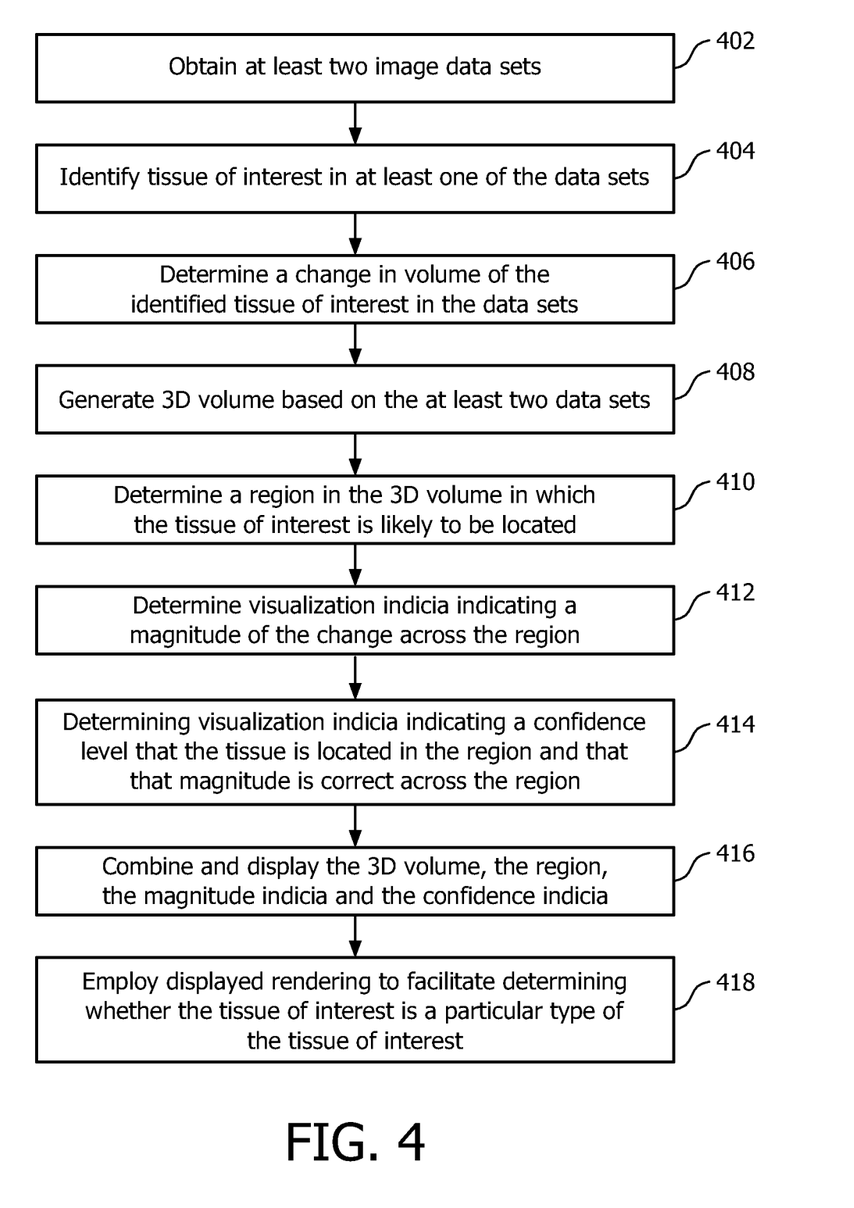
FIG. 4 illustrates an example method in accordance the image data processing system described herein.

FIG. 4 illustrates a method in accordance with the image data processing system 118 of FIGS. 1 and 2.

It is to be appreciated that the ordering of the acts in the method described herein is not limiting. As such, other orderings are contemplated herein. In addition, one or more acts may be omitted and/or one or more additional acts may be included.

At 402, at least two image data sets are obtained. The at least two image data sets correspond to scans performed at different moments in time.

At 404, a tissue of interest is identified in at least one of the image data sets. At 406, a change in volume is determined between the identified tissue of interest in the different image data sets.

At 408, a 3D volume is generated based on the at least two image data sets.

At 410, a region in the 3D in which the tissue of interest is located is determined.

At 412, visualization indicia that indicates a magnitude of the change in volume across the region is determined.

At 414, visualization indicia that indicates a confidence that the tissue of interest is located in the region and/or that the determined change in volume represents the change in volume across the region is determined.

At 416, the 3D volume, the region, the magnitude indicia and/or the confidence indicia are combined and visually displayed.

At 418, a user employs the rendering to facilitate determining whether the tissue of interest is a particular type of the tissue of interest. For example, the rendering can be used to facilitate whether tissue identified is indeed a malignant nodule.

The above methods may be implemented by way of computer readable instructions, encoded or embedded on computer readable storage medium, which, when executed by a computer processor(s), cause the processor(s) to carry out the described acts. Additionally, or alternatively, at least one of the computer readable instructions is carried by a signal, carrier wave or other transitory medium.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A method, comprising:
   determining a change in a volume of a tissue of interest located in at least two data sets, wherein the change is determined between the at least two data sets,
   wherein the at least two image data sets include a first image data set acquired at a first time and a follow up second image data set acquired at a second time, and the first and second times are different, wherein the change corresponds to an increase in a physical size of the tissue of interest due to a growth of the tissue of interest between the first and second times;
   generating a rendering which includes a region in which the tissue of interest is located and indicia that indicates a magnitude of the change across the region,
   wherein the region is superimposed over only a sub-portion of the rendering, which is generated based on at least one of the at least two image data sets, and linked to a corresponding image respectively in the at least two image data sets including voxels representing tissue of interest; and
   visually presenting the rendering in a graphical user interface.

2. The method of claim 1, wherein the linking identifies a subset of the at least two image data sets to be evaluated.

3. The method of claim 1, wherein the at least two image data sets are computed tomography image data sets and the region and indicia is rendered to include a "hot spot" superimposed over a three dimensional rendering of the computed tomography image data.

4. The method of claim 1, wherein a location and/or a geometry of the region indicates a volume in which the tissue of interest is located.

5. The method of claim 4, wherein a transparency level of the indicia indicates a confidence level that the identified tissue of interest is in the region.

6. The method of claim 4, wherein a color or gray value of the indicia indicates a magnitude of the change in the volume of the tissue of interest across the region.

7. The method of claim 6, wherein the transparency level of the indicia further indicates a confidence level of the magnitude of the change in the volume across the region.

8. The method of claim 1, wherein a shape of the region indicates an estimated size of the tissue of interest.

9. The method of claim 1, wherein the change in volume is determined prior to identifying images of the image data sets for further evaluation.

10. The method of claim 1, further comprising:
    visually presenting a first image from the first image data set and a second image from the second image data set based on the link in response to a signal indicative of a user identified portion of the indicia, wherein the first image and the second image correspond to the identified portion of the indicia.

11. An image data processing system, comprising:
    a change in tissue volume determiner that is configured to determine a change a volume of a tissue of interest, located in at least two data sets, wherein the change is determined between the at least two data sets,
    wherein the at least two image data sets include a first image data set acquired at a first time and a second image data set acquired at a follow up second time, and the first and second times are different, wherein the change corresponds to an increase in a physical size of the tissue of interest due to a growth of the tissue of interest between the first and second times;
    a rendering engine that is configured to render a rendering and combine a volume image generated based on the at least two data sets with a likelihood region that indicates a region in which the tissue of interest is located, wherein the region is superimposed over only a sub-portion of the rendering and indicia indicating a change in the volume of the tissue of interest across the region, wherein the region is linked to a corresponding image respectively in the at least two image data sets including voxels representing tissue of interest; and
    a display which is configured to visually present the rendering in a graphical user interface.

12. The image data processing system of claim 11, wherein the linking is configured to identify a subset of the at least two image data sets to be evaluated to confirm the identified tissue of interest.

13. The image data processing system of claim 11, wherein the at least two image data sets are computed tomography image data sets and the indicia is rendered to include a "hot spot" superimposed over a three dimensional rendering of the computed tomography image data.

14. The image data processing system of claim 11, wherein a location and/or a geometry of the region indicates a volume in which the tissue of interest is located.

15. The image data processing system of claim 11, wherein a color or gray scale of the indicia indicates a magnitude of the change in the volume of the tissue of interest across the region.

16. The image data processing system of claim 14, wherein a transparency level of the indicia further indicates at least one of a confidence level that the tissue of interest is in the volume or a confidence level of the magnitude of the volume across the region.

17. The image data processing system of claim 11, wherein a shape of the region indicates an estimated size of the tissue of interest.

18. The image data processing system of claim 11, wherein the graphical user interface includes image manipulation tools including at least one of rotate, pan, zoom, window and level.

19. The image data processing system of claim 11, wherein the display visually presents a first image from the first image data set and a second image from the second image data set based on the link in response to a signal indicative of a user identified portion of the indicia, wherein the first image and the second image correspond to the identified portion of the indicia.

20. A computer readable storage medium encoded with computer readable instructions, which, when executed by a processor of a computing system, causes the processor to: determine a change in a volume of a tissue of interest located in at least in at least two data sets, where the change is determined between the at least two data sets, wherein the first data set is acquired at a first time and the second data set is acquired at a follow up second time, wherein the change corresponds to an increase in a physical size of the tissue of interest due to a growth of the tissue of interest between the first and second times, and generate and visually present a rendering which includes a region in which a tissue of interest is located, wherein the region is super imposed over only a sub-portion of the rendering, first indicia that indicates a change in a magnitude of the volume across the region and second indicia that indicates a confidence that the tissue of interest is located in the region and that the change in magnitude across the region represents the change in magnitude, wherein the first indicia is a color or gray scale value and the second indicia is a transparency level.

\* \* \* \* \*